United States Patent [19]

Adachi

[11] Patent Number: 4,870,678

[45] Date of Patent: Sep. 26, 1989

[54] STORE AND FORWARD SWITCHING TYPE COMMUNICATION CONTROL APPARATUS

[75] Inventor: Eiichi Adachi, Atsugi, Japan

[73] Assignee: Ricoh Company, Ltd., Tokyo, Japan

[21] Appl. No.: 269,695

[22] Filed: Nov. 10, 1988

[30] Foreign Application Priority Data

Nov. 10, 1987 [JP] Japan ................................ 62-284755

[51] Int. Cl.⁴ ........................ H04N 11/00; H04N 1/32
[52] U.S. Cl. ...................................... 379/100; 379/93; 358/434
[58] Field of Search ........................... 379/100, 93, 94; 358/257

[56] References Cited

FOREIGN PATENT DOCUMENTS 0095048  5/1987  Japan .................................... 379/100
0146044  6/1987  Japan .................................... 379/100

Primary Examiner—Jin F. Ng
Assistant Examiner—Wing F. Chan

Attorney, Agent, or Firm—Oblon, Spivak, McClelland, Maier & Neustadt

[57] ABSTRACT

A store and forward switching type communication control apparatus for use in a facsimile communication system includes a switching unit, a plurality of internal line interfaces, a plurality of external line interfaces, a plurality of facsimile communication units, a tone generator, a memory and a control unit. The internal line interfaces are connected to a plurality of terminal units, such as telephone units and facsimile units, through respective internal lines. The external line interfaces are connected to an external communication network, such as a telephone network. When one of the terminal units is off-hooked, the availability status of the resources, such as the external line interfaces, the facsimile communication units and the memory, which are available to that terminal unit which has been off-hooked is examined and its result of examination is supplied to the terminal unit in question in order to apprise the operator of the current availability status of the resources.

5 Claims, 8 Drawing Sheets

STORE AND FORWARD SWITCHING TYPE COMMUNICATION CONTROL APPARATUS

BACKGROUND OF THE INVENTION

1. Field of the Invention

This invention generally relates to a dual mode communication control apparatus having both of a direct communication mode and a store and forward communication mode, and, in particular, to a store and forward switching type communication control apparatus connected between a plurality of internal and external lines.

2. Description of the Prior Art

A store and forward switching type communication apparatus capable of once storing image information to be transmitted in a memory and then transmitting the thus stored image information to a destination station has recently attracted attention due to the recent rapid dissemination of facsimile machines. Such a store and forward switching type communication apparatus has two modes of operation, i.e., (1) a direct communication mode, in which one of the internal lines is directly connected to one of the external lines to carry out communication in response to a call received through either an internal or external line and (2) a store and forward communication mode, in which, when a call has been received from one of the internal lines, the image information transmitted through this internal line is once stored in a memory, and then the thus stored image information is transmitted to a destination station at a designated time.

In the direct communication mode, the store and forward switching type communication control apparatus carries out a sequence of operation, including the steps of (1) off-hook from a telephone unit or a facsimile machine connected to one of the internal lines; (2) apprising of the off-hook status to a control unit through an interface of the internal line; (3) securing of resources of the internal line interface by the control unit; (4) designating a connection between the internal line interface and a DT (dial tone) sound source from the control unit to a switching unit; (5) inputting (designation of operation and the telephone number of the destination station) by dialing (dial pulse signal (DP) or push button signal (PB)) from the internal line side; (6) designating a release of connection between the internal line interface and the DT sound source from the control unit to the switching unit; (7) securing of an external line interface; (8) instructing the external interface to place a call to the destination station; (9) designating a connection between the internal interface and the external interface from the control unit to the switching unit; (10) initiation of facsimile communication (or aural communication); (11) off-hook from the internal line side; (12) apprising of the off-hook status to the control unit from the internal interface; and (13) releasing of the resources (disconnecting the switching unit from the internal and external interfaces).

On the other hand, during the store and forward communication mode, the store and forward communication apparatus carries out a sequence of steps, which include: (1) off-hook signal from a telephone unit or facsimile machine connected to an internal line; (2) apprising of the off-hook status to the control unit from the internal line interface; (3) securing of resources of the internal line interface by the control unit; (4) designating a connection between the internal line interface and a DT sound source from the control unit to the switching unit; (5) inputting (designation of operation and the telephone number of the destination station) by dialing (DP or PB) from the internal line side; (6) instructing the switching unit to release a connection between the internal line interface and the DT sound source from the control unit; (7) apprising a store and forward communication operation and the telephone number of the destination station to the control unit from the internal line interface; (8) designating a connection between the internal line interface and a communicating means for facsimile communication from the control unit to the switching unit; (9) instructing a reception operation to the communicating means for facsimile communication from the control unit; (10) designating transmission to a facsimile machine connected to the internal line; (11) initiation of facsimile communication; (12) storing of received image information into storing means from the communicating means for facsimile communication; (13) completion of facsimile communication; (14) off-hook signal from the internal line; (15) apprising of off-hook from the internal line interface to the control unit; and (16) releasing of the resources (disconnection among the internal line interface, the communication means for facsimile communication and the switching unit).

With this structure, since a plurality of communication terminals, such as telephone units and/or facsimile machines, can be managed by a common store and forward switching communication control apparatus, the use rate of a transmission network can be significantly enhanced. However, in such a prior art store and forward switching type communication control apparatus, when transmission is to be carried out from an internal line to an external line, it is only after inputting of operational instructions and the telephone number of a destination station by an operator of a communication terminal connected to the internal line that the status of various resources of the communication control apparatus, such as interfaces, transmission lines, communicating means and storing means, is checked and securing of resources is carried out. Thus, there is a case in which, even if a dial tone is properly generated during off-hook, required resources cannot be secured by a dialing operation because such resources as interfaces and transmission lines are in the busy status, thereby waisting the operation by the operator. In this case, the exactly the same operation must be repeated by the operator and thus there is a lack of easiness or convenience in operation.

SUMMARY OF THE INVENTION

In accordance with the present invention, there is provided a store and forward switching type communication control apparatus in which, when an off-hook signal is supplied from a terminal unit through an internal line, the status of resources available to that internal line is first examined and the result of the examination is supplied to the terminal unit through the internal line. With this structure, since the current status of available resources is supplied to an operator at the terminal unit before the operator executes a required input operation, such as inputting of operational commands and the telephone number of a destination station, to the terminal unit, the operator is not required to execute the same input operation repetitively as in the prior art.

It is therefore a primary object of the present invention to obviate the disadvantages of the prior art as described above and to provide an improved store and forward switching type communication control apparatus.

Another object of the present invention is to provide an improved store and forward switching type communication control apparatus high in efficiency and operability.

A further object of the present invention is to provide an improved store and forward switching type communication control apparatus capable of preventing an operator's operation from being nullified because of the lack of availability of a required resource.

Other objects, advantages and novel features of the present invention will become apparent from the following detailed description of the invention when considered in conjunction with the accompanying drawings.

DESCRIPTION OF THE PREFERRED EMBODIMENTS

Figure 1:
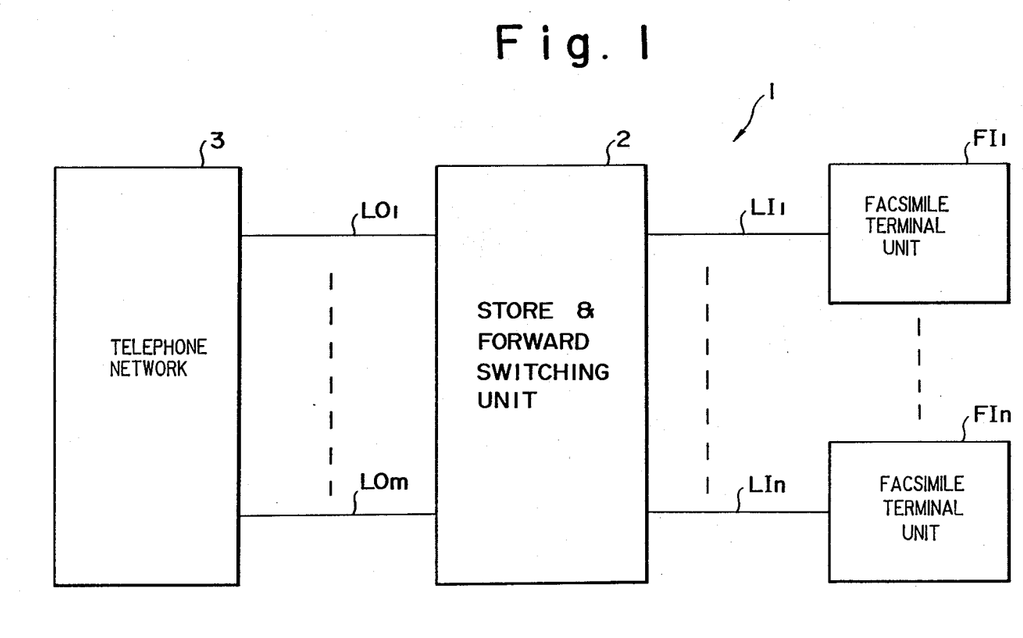
FIG. 1 is a block diagram showing the overall structure of a facsimile communication system incorporating a store and forward switching type communication control apparatus constructed in accordance with one embodiment of the present invention.

Referring now to FIG. 1, there is schematically shown in block form a facsimile communication system 1 using a store and forward switching type communication control apparatus constructed in accordance with one embodiment of the present invention. As shown, the facsimile communication system 1 includes a store and forward switching type communication control apparatus 2, a plurality of internal lines $LI_1$ through $LI_n$ connected to the communication control apparatus 2, a plurality of external lines $LO_1$ through $LO_m$ connected to the communication control apparatus 2, and a plurality of facsimile terminal units $FI_1$ through $FI_n$ connected to the plurality of internal lines $LI_1$ through $LI_n$, respectively. The plurality of external lines $LO_1$ through $LO_m$ have their opposite ends connected to a transmission network, such as a telephone network 3.

Figure 2:
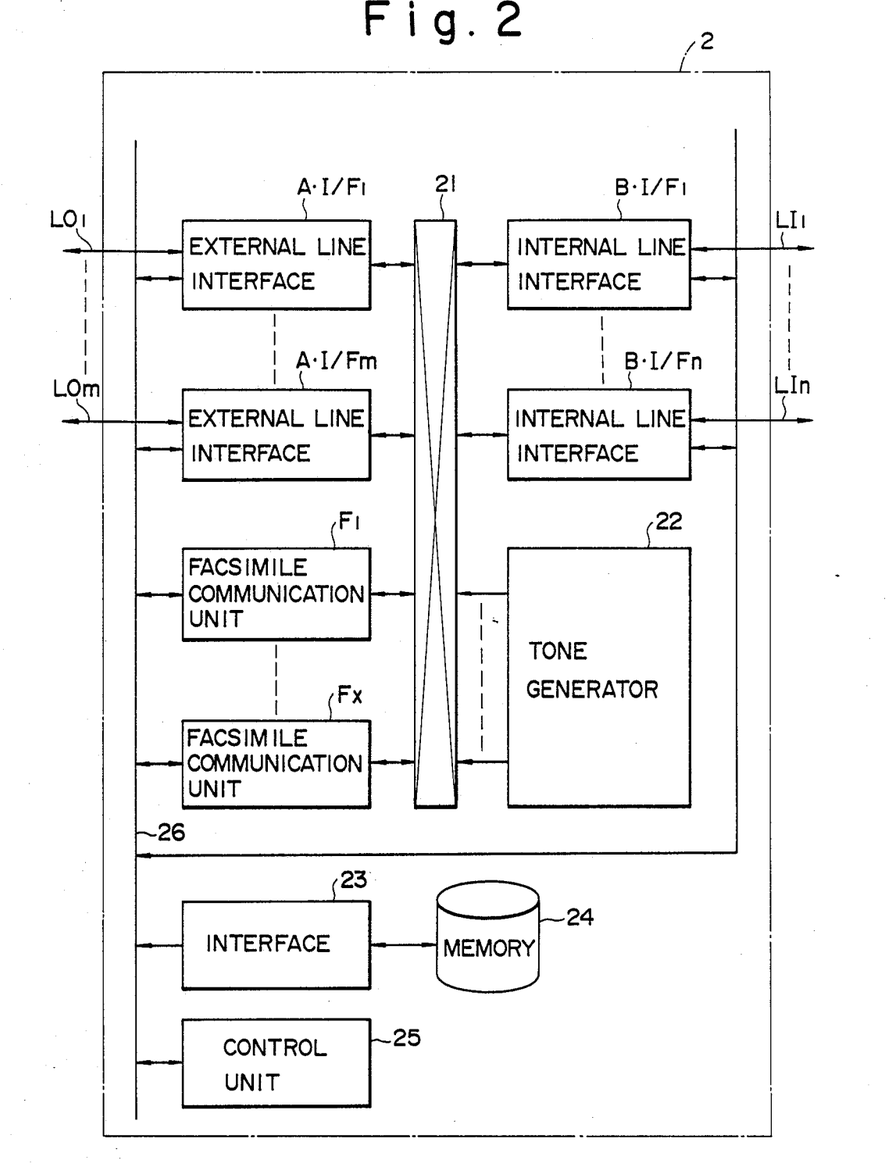
FIG. 2 is a schematic illustration showing in block form the store and forward switching type communication control apparatus incorporated in the facsimile communication system shown in FIG. 1.

As shown in FIG. 2, the store and forward switching type communication control apparatus 2 includes a switching unit 21, a plurality of external line interfaces $A·I/F_1$ through $A·I/F_m$, a plurality of facsimile communication units (communication means) $F_1$ through $F_x$, internal line interfaces $B·I/F_1$ through $B·I/F_n$, a tone generator 22, an interface 23, a memory (image information storing means) 24, a control unit (control means) 25 and a bus 26 connected to each of the components provided in the apparatus 2. The external line interfaces $A·I/F_1$ through $A·I/F_m$ are connected to the plurality of external lines $LO_1$ through $LO_m$, respectively and also to the switching unit 21, and they are in charge of inputting and outputting of analog signals. The internal line interfaces $B·I/F_1$ through $B·I/F_n$ are connected to the plurality of internal lines $LI_1$ through $LI_n$, respectively, and also to the switching unit 21, and they are in charge of inputting and outputting of analog signals. It is to be noted that the external line interfaces $A·I/F_1$ through $A·I/F_m$ and the internal line interfaces $B·I/F_1$ through $B·I/F_n$ are provided with tone signal detectors and off-hook detectors so that they detect various tone signals and off-hook conditions to thereby supply detection signals to the control unit 25.

The switching unit 21 is connected to the external line interfaces $A·I/F_1$ through $A·I/F_m$, to the internal line interfaces $B·I/F_1$ through $B·I/F_n$, to the facsimile communication units $F_1$ through $F_x$, and also to the tone generator 22, so that the switching unit 21 controls an operative coupling between these components. Each of the facsimile communication units $F_1$ through $F_x$ is provided with a MODEM, a compression/decompression unit, and a 2K byte double buffer memory. Thus, the image information received from a transmitter at a remote station is demodulated, decompressed and stored into one of the two buffer memories, and, as soon as the memory has become full, the image data thus stored therein is transferred to the memory 25 (input operation). On the other hand, the image information transferred from the memory 25 is stored into one of the two memories of the double buffer memory, and the image information is supplied to a terminal unit after demodulation (output operation).

Figure 3:
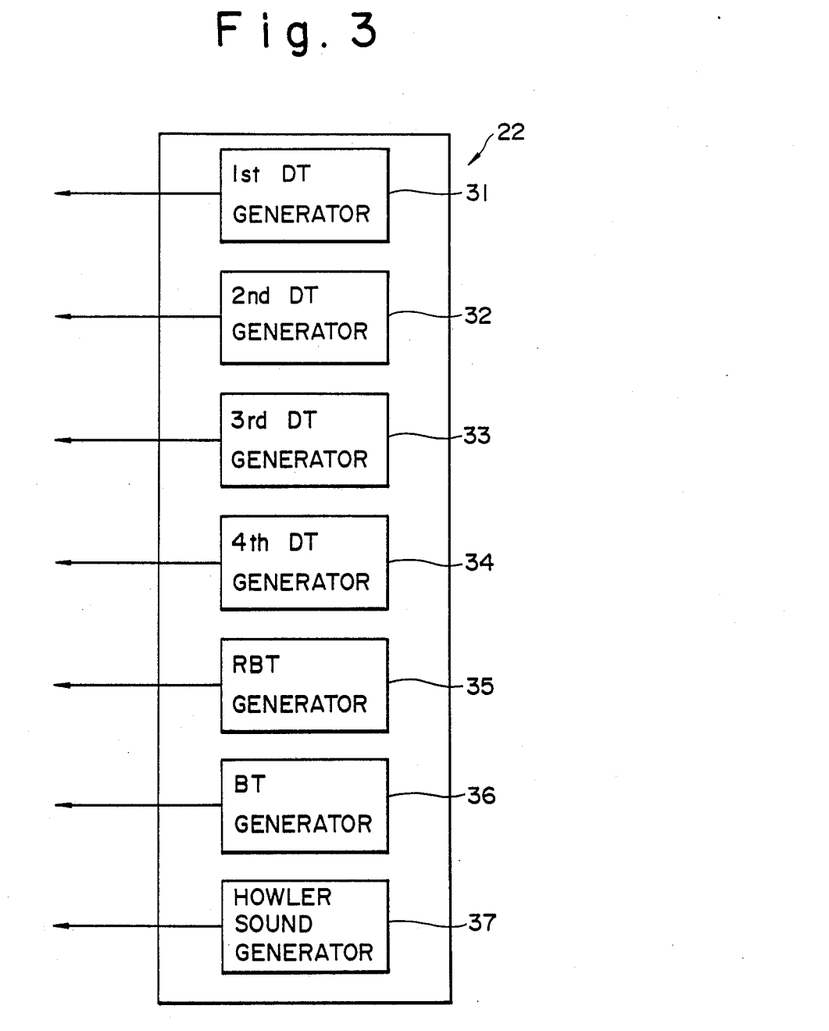
FIG. 3 is a block diagram schematically showing the structure of a tone generator provided in the store and forward switching type communication control apparatus of FIG. 2.
Figure 4A:
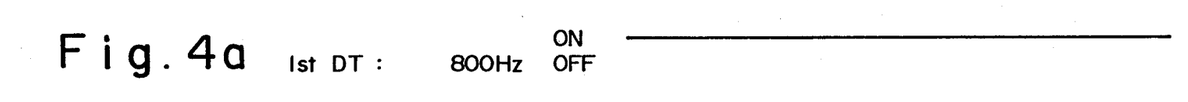
FIGS. 4a through 4g are waveform diagrams showing waveforms of various signals generated by the tone generator of FIG. 3.
Figure 4B:
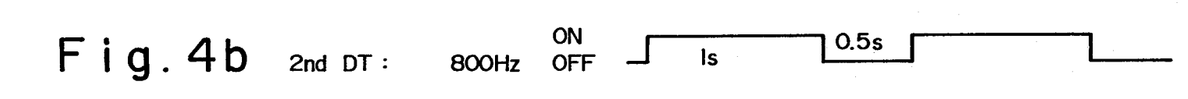
Figure 4C:
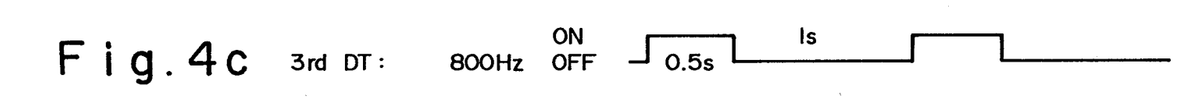
Figure 4D:
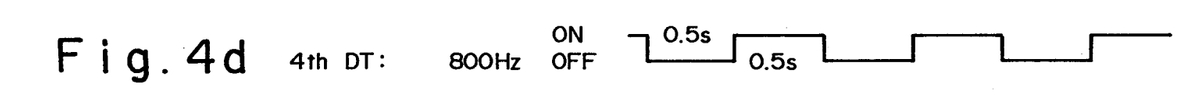
Figure 4E:
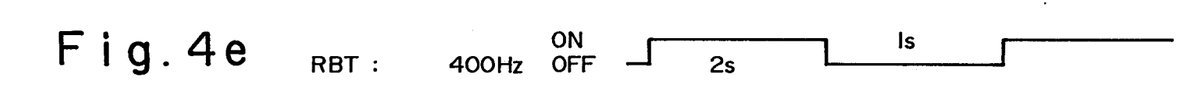
Figure 4F:
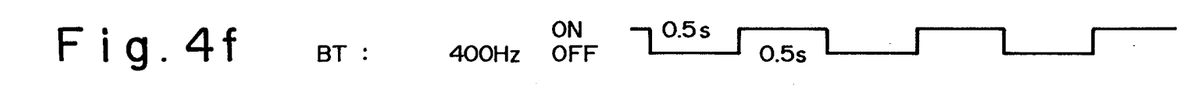
Figure 4G:
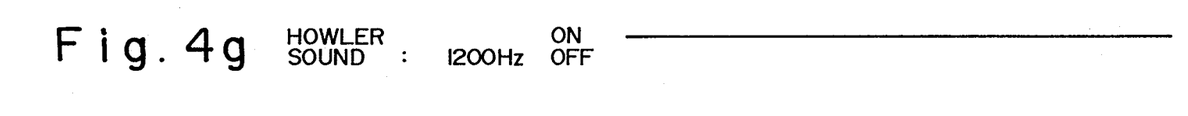

The tone generator 22, as shown in FIG. 3, includes a first DT generator 31, a second DT generator 32, a third DT generator 33, a fourth DT generator 34, a RBT generator 35, a BT generator 36 and a howler sound generator 37. The DT generators 31 through 34 generate dial tones, for example, such as those shown in FIGS. 4a through 4d. That is, the first DT generator 31 outputs a continuous tone of 800 Hz and the second DT generator 32 outputs a tone of 800 Hz continuous for one second at 0.5 second intervals. The third DT generator 33 outputs a tone of 800 Hz continuous for 0.5 seconds at one second intervals, and the fourth DT generator 34 outputs a tone of 800 Hz continuous for 0.5 seconds at 0.5 second intervals. The RBT generator 35 generates a ring back tone (RBT) shown in FIG. 4e and the BT generator 36 generates a busy tone (BT) shown in FIG. 4f. The howler sound generator 37 generates a howler sound (abnormal condition indicating sound) shown in FIG. 4g.

Returning to FIG. 2, the memory 24 stores image information supplied from a terminal unit in the form of a file according to a designated destination to which the image information is to be transmitted, and thus the memory 24 also stores such information as the name of designated destination, its telephone number and various other management information. The control unit 25 controls the switching unit 21, tone generator 22, memory 24, external line interfaces $A \cdot I/F_1$ through $A \cdot I/F_m$, internal line interfaces $B \cdot I/F_1$ through $B \cdot I/F_n$ and facsimile communication units $F_1$ through $F_x$ to thereby cause the store and forward switching type communication control apparatus 2 to carry out a sequence of steps relating to a resource status examination process in accordance with one aspect of the present invention.

In operation, the store and forward switching type communication control apparatus 2 has two modes of operation, i.e., (1) direct communication mode, in which a communication is carried out among the internal lines $LI_1$ through $LI_n$ or a switching operation is carried out between the internal lines $LI_1$ through $LI_n$ and the external lines $LO_1$ through $LO_m$, and (2) store and forward communication mode, in which image information supplied to the store and forward switching type communication control apparatus 2 from one of the facsimile machines $FI_1$ through $FI_n$ connected to the internal lines $LI_1$ through $LI_n$ or the the external lines $LO_1$ through $LO_m$ is once stored in the memory 24 of the store and forward switching type communication control apparatus 2 and then the thus stored image information is read out at an appropriate timing from the memory 24 to be transmitted to a destination which may be one of the facsimile terminal units $FI_1$ through $FI_n$.

In accordance with the principle of the present invention, when one of terminal units, which may be either telephone units or facsimile units, $FI_1$ through $FI_n$ connected to the internal lines $LI_1$ through $LI_n$ is off-hooked, the present status or availability condition of the resources of the store and forward switching type communication control apparatus 2 which are available to the internal lines $LI_1$ through $LI_n$ is first examined and its result is apprised to the operator before an input operation is carried out by the operator, so that the operator is prevented from carrying out an invalid input operation since the availability condition of the resources is indicated to the operator before the operator carries out an input operation.

Figures 5, 5A:
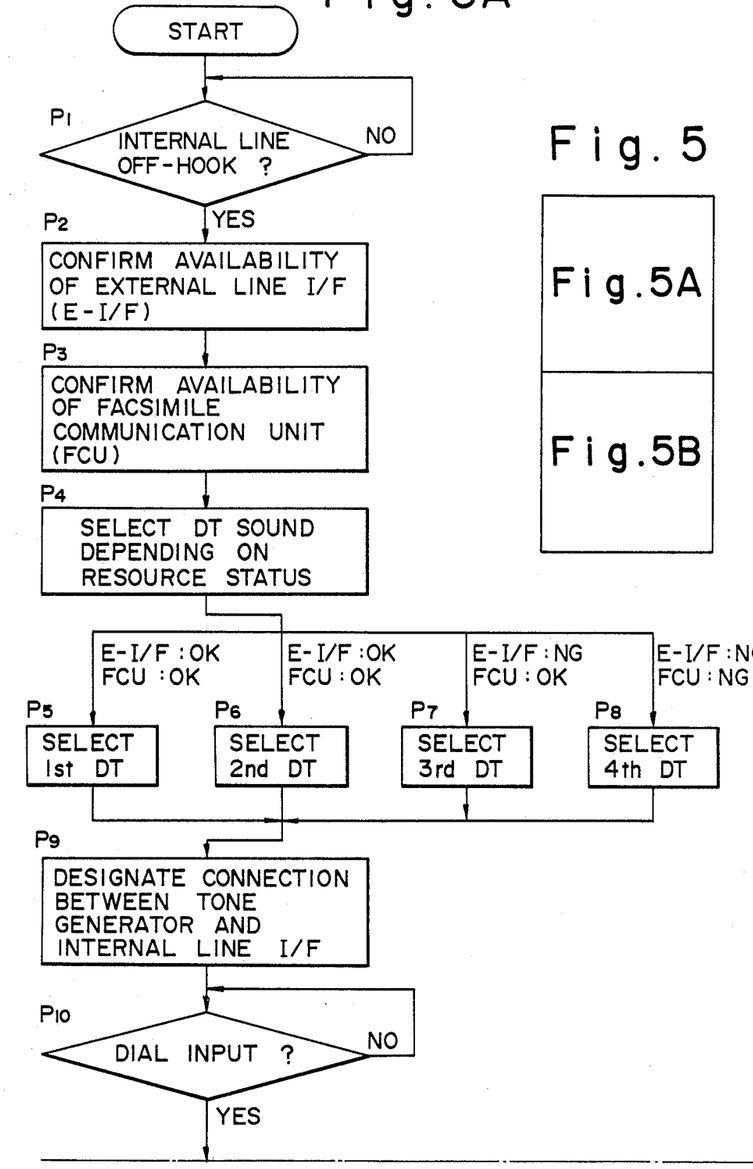
FIG. 5 is an illustration showing how to combine FIGS. 5A and 5B.
FIGS. 5A and 5B, when combined as shown in FIG. 5, define a flow chart showing a sequence of steps of a resource status examination process to be executed in the store and forward switching type communication control apparatus of FIG. 2.
Figure 5B:
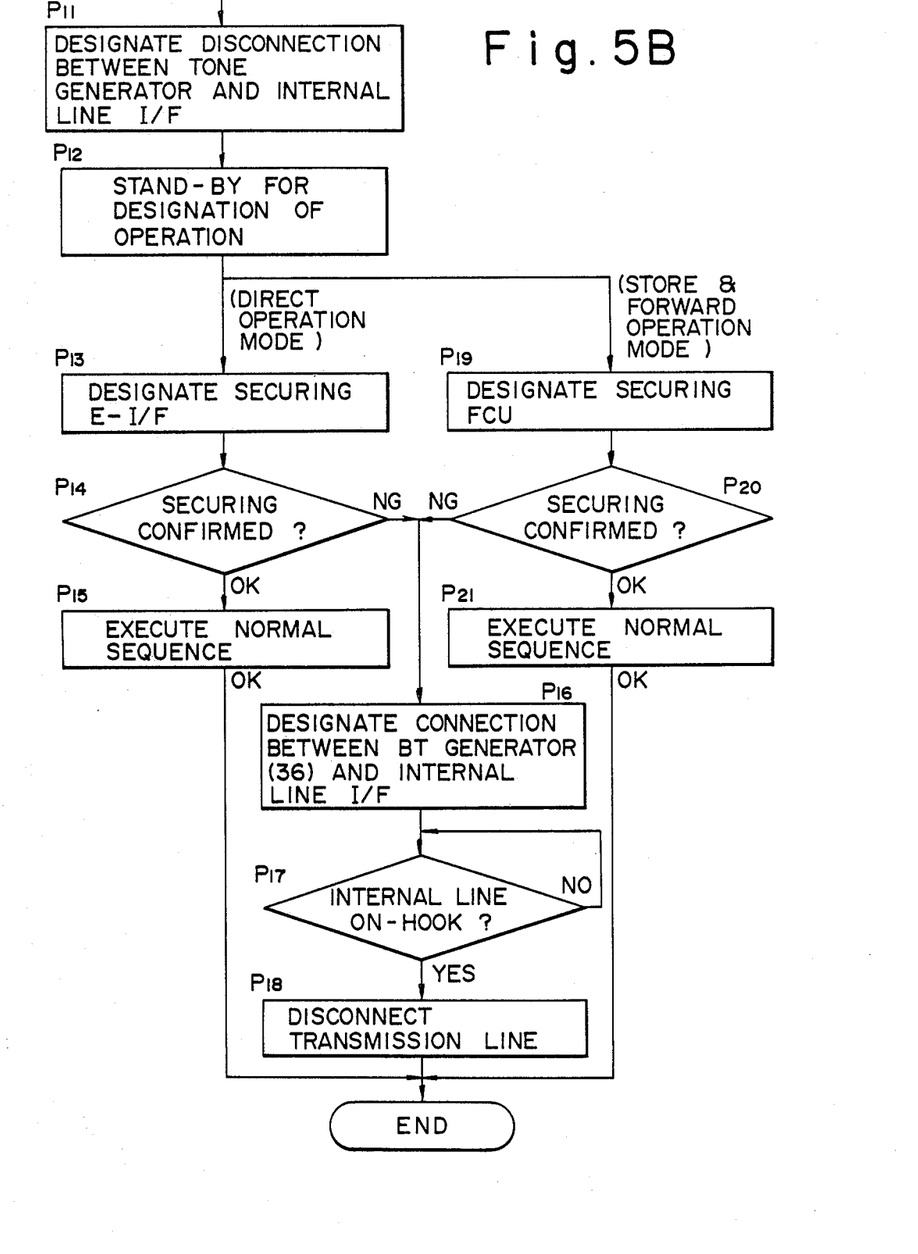

Hereinafter, with particular reference to the flow chart shown in FIGS. 5A and 5B, the resource status examination process will be described in detail. When one of the telephone units or facsimile units $FI_1$ through $FI_n$ connected to the internal lines $LI_1$ through $LI_n$ is off-hooked (step $P_1$), the control unit 25 examines whether or not the external line interfaces $A \cdot I/F_1$ through $A \cdot I/F_m$ are available (step $P_2$) and whether or not the facsimile communication units $F_1$ through $F_x$ are available (step $P_3$). Then, based on the availability condition of the resources, the control unit 25 selects one of the first through third DT generators 31 through 33 of the tone generator 22 in accordance with the availability condition of the resources (in the illustrated embodiment, external line interfaces $A \cdot I/F_1$ through $A \cdot I/F_m$ and facsimile communication units $F_1$ through $F_x$) of the store and forward switching type communication control apparatus 2 (step $P_4$). That is, as shown in the table below, if both of the external line interfaces $A \cdot I/F_1$ through $A \cdot I/F_m$ and the facsimile communication units $F_1$ through $F_x$ are available (OK), the first DT generator 31 is selected (step $P_5$). If the external line interfaces $A \cdot I/F_1$ through $A \cdot I/F_m$ are available (OK), but the facsimile communication units $F_1$ through $F_x$ are not available (NG), then the second DT generator 32 is selected (step $P_6$). And, if the external line interfaces $A \cdot I/F_1$ through $A \cdot I/F_m$ are not available (NG) and the facsimile communication units $F_1$ through $F_x$ are available (OK), then the third DT generator 33 is selected (step $P_7$). And, if neither the external line interfaces $A \cdot I/F_1$ through $A \cdot I/F_m$ nor the facsimile communication units $F_1$ through $F_x$ are available (NG), then the fourth DT generator 34 is selected (step $P_8$).

TABLE

| | 1st DT Generator 31 | 2nd DT Generator 32 | 3rd DT Generator 33 | 4th DT Generator 34 |
|---|---|---|---|---|
| External Line Interface | OK | OK | NG | NG |
| Facsimile Communication Unit | OK | NG | OK | NG |

Then, the control unit 25 designates to the switching unit 21 a connection between one of the first through fourth DT generators 31 through 34 of the tone generator 22 which has been selected by the above-described processing and one of the internal line interfaces $B \cdot I/F_1$ through $B \cdot I/F_n$ which corresponds to the off-hooked one of the internal lines $LI_1$ through $LI_n$ (step $P_9$). When such a connection has been established, a dial tone generated by the thus selected DT generator is output to the internal line $LI_1$ through $LI_n$. Depending on the kind of the dial tone thus received, the operator at the terminal unit will know the availability condition of the resources of the store and forward switching type communication control apparatus 2. For example, if the dial tone thus received is from the first DT generator 31, the operator will know that facsimile communication is also available. If it is the dial tone from the second DT generator 32, the operator will know that facsimile communication is not available, but telephone communication is available. If the dial tone received is from the fourth DT generator 34, the operator will know that he or she must wait until some resources become available because there is no available resources right at the moment. As a result, in accordance with the present invention depending on the kind of the dial tone received, the operator can determine the availability condition of the resources of the store and forward switching type communication control apparatus 2 and then whether or not to carry out a next step, such as dialing operation or facsimile transmission operation. Thus, the operator is prevented from carrying out an input operation in the case where there is no available resources.

Then, when a dialing operation is carried out (step $P_{10}$), the control unit 25 designates a release of a connection between the tone generator 22 and the internal line interfaces $B \cdot I/F_1$ through $B \cdot I/F_n$ to the switching unit 21 (step $P_{11}$) and waits for an operational instruction supplied through one of the internal lines $LI_1$ through $LI_n$ (step $P_{12}$). If the operational instruction supplied indicates a direct communication mode, the external line interfaces $A \cdot I/F_1$ through $A \cdot I/F_m$ are secured (step $P_{13}$), and when they are secured, i.e., set in the state of "OK", (step $P_{14}$), a sequence of steps of the ordinary direct communication mode is carried out (step $P_{15}$). If the external line interfaces $A \cdot I/F_1$ through $A \cdot I/F_m$ have not been secured at step $P_{14}$ (NG), the DBT generator 36 of the tone generator 22 is connected to the internal line interfaces $B \cdot I/F_1$ through $B \cdot I/F_n$ of the internal lines $LI_1$ through LI (step $P_{16}$), and then the transmission line is disconnected (step $P_{18}$) as soon as the internal lines $LI_1$ through $LI_n$ have been on-hooked (step $P_{20}$).

On the other hand, if the direct communication mode has been designated at step $P_{12}$, securing of the facsimile communication units $F_1$ through $F_x$ is designated (step $P_{19}$), and, upon securing (step $P_{20}$), a sequence of the normal store and forward communication mode is carried out (step $P_{21}$). If the facsimile communication units $F_1$ through $F_x$ have not been secured at step $P_{20}$, it proceeds to step $P_{16}$ to apprise of this fact to the operator to thereby carry out a similar process (steps $P_{16}$ through $P_{18}$).

In the above-described embodiment, it is so structured that, when an off-hook state has been created at one of the internal lines, the availability status of the resources is examined and the result of its examination is supplied to the internal line, whereby securing of the resources is carried out in response to an operational instruction supplied from the internal line. However, the present invention should not be limited only to such a specific structure, and it may also be so structured that securing of resources is carried out simultaneously with the examination of resources as soon as an off-hook status has been created. A sequence of steps in this mode of operation is illustrated in the form of a flow chart in FIGS. 6A and 6B and its sequence will be described below with particular reference to the flow chart shown in FIGS. 6A and 6B. It is to be noted that since the sequence of steps shown in the flow chart of FIGS. 5A and 5B is similar in many respects to that of the flow chart shown in FIGS. 6A and 6B, like steps are indicated by like reference numerals and repetitive description will be avoided.

Figures 6, 6A:
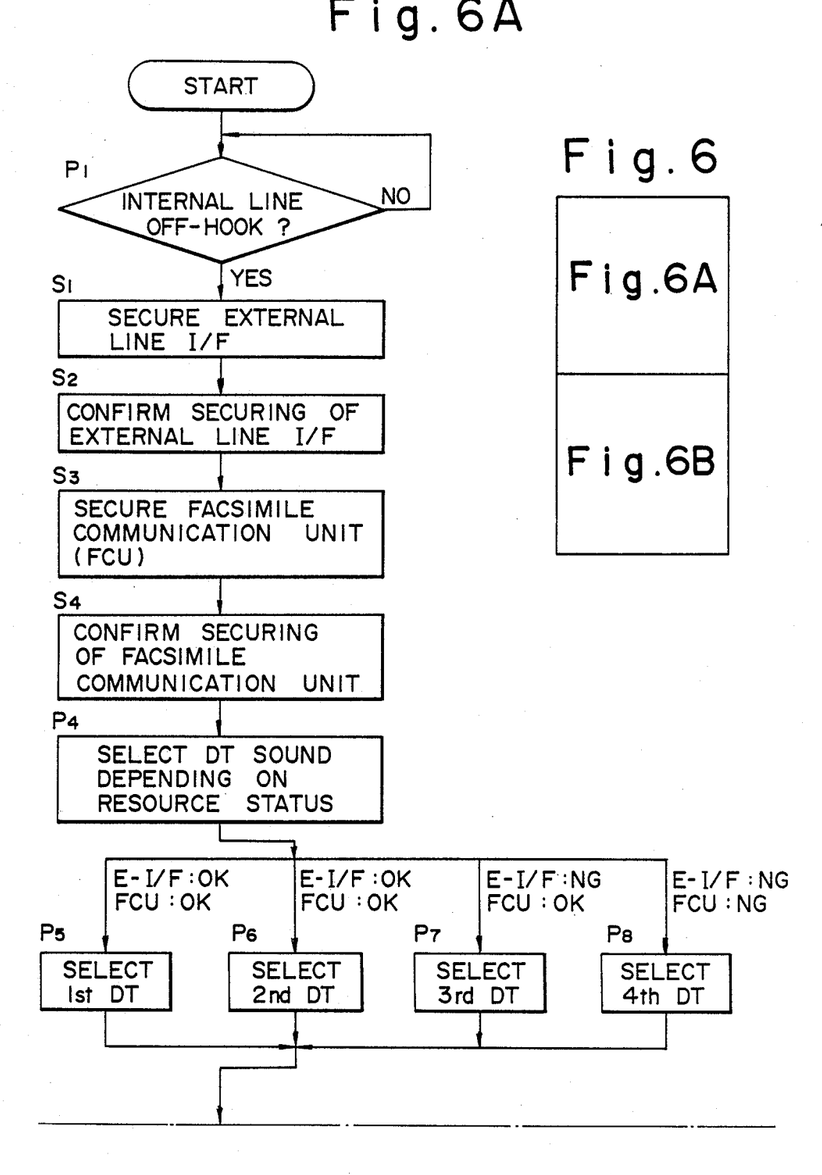
FIG. 6 is an illustration showing how to combine FIGS. 6A and 6B.
FIGS. 6A and 6B, when combined as shown in FIG. 6, define a flow chart showing a sequence of steps of a resource status examination and resource securing process to be executed in the store and forward switching type communication control apparatus of FIG. 2.
Figure 6B:
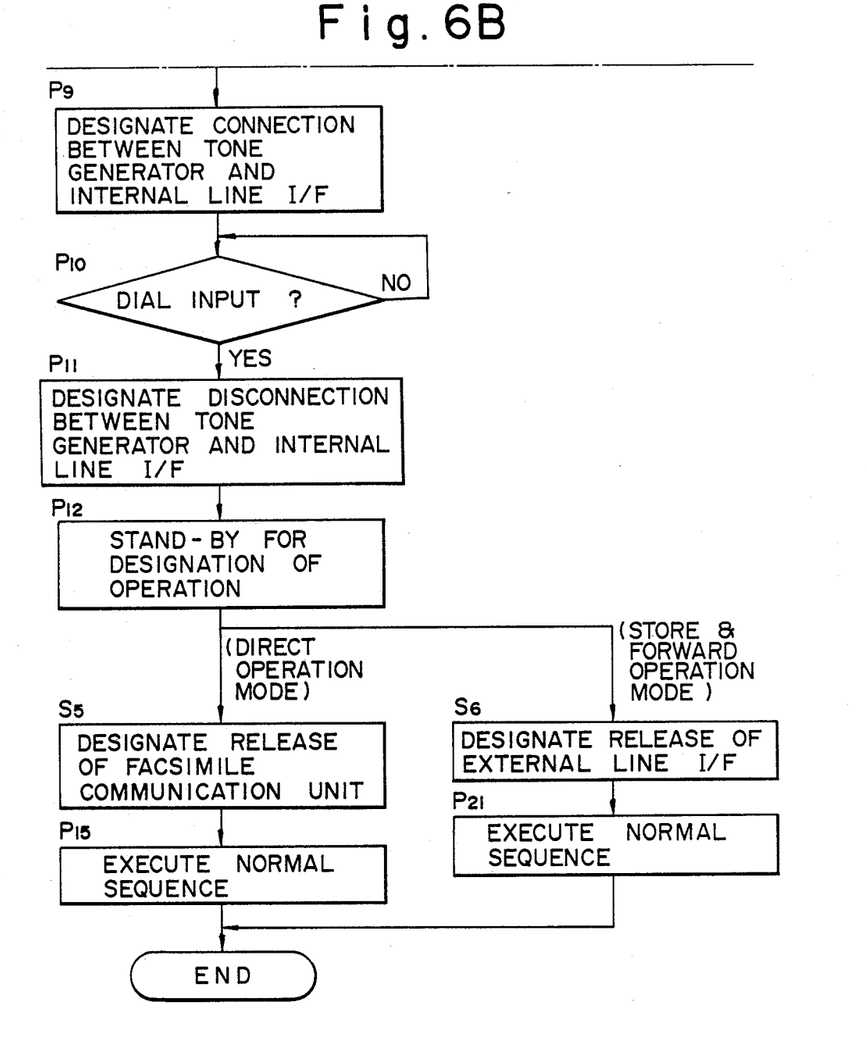

When one of the internal lines $LI_1$ through $LI_n$ has been off-hooked (step $P_1$), the control unit 25, in the first place, designates to secure the external line interaces $A\cdot I/F_1$ through $A\cdot I/F_m$ (step $S_1$) and confirms the securing condition of the external line interfaces $A\cdot I/F_1$ through $A\cdot I/F_m$ (step $S_2$). Then, it is designated to secure the facsimile communication units $F_1$ through $F_x$ (step $S_3$) and the secured condition of the facsimile communication units $F_1$ through $F_x$ is confirmed (step $S_4$). Depending on the secured condition of the external line interfaces $A\cdot I/F_1$ through $A\cdot I/F_m$ and the facsimile communication units $F_1$ through $F_x$, i.e., the current availability status of the resources, one of the dial toner generators 31 through 34 of the tone generator 22 is selected (steps $P_4$ through $P_8$) in a manner similar to the previously described embodiment to thereby output the dial tone of the thus selected dial tone generator, one of 31 through 34, to a corresponding one of the internal lines $LI_1$ through $LI_n$ (step $P_9$). Depending on the kind of the dial tone thus received, the operator will know the secured condition or current availability condition of resources. As a result, the operator is prevented from carrying out an invalid inputting operation. In addition, in accordance with this embodiment, since the required resources have already been secured, the operator can implement the subsequent operation at ease.

Then, the operator inputs an operational instruction, and if it indicates the direct communication mode, the control unit 25 designates a release of the facsimile communication units $F_1$ through $F_x$ (step $S_5$) so that a sequence of the ordinary direct communication mode is carried out (step $P_{15}$). On the other hand, if the operational instruction given by the operator indicates the store and forward communication mode, the release of the external line interfaces $A\cdot I/F_1$ through $A\cdot I/F_m$ is designated (step $S_6$), whereby a sequence of the ordinary store and forward communication mode of operation is carried out (step $P_{21}$).

As described above, in accordance with the present invention, since the current availability status or condition of the resources is apprised to the operator when the operator has established an off-hook status at one of the terminal units connected to the internal lines of the store and forward switching type communication control apparatus prior to any input operation by the operator, any invalid input operation is prevented from being carried out by the operator. Thus, there is provided an improved store and forward switching type communication control apparatus high in operability and efficiency.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A store and forward switching type communication control apparatus comprising:
   an internal line interface for establishing a connection to an internal line connected to a terminal unit;
   an external line interface for establishing a connection to an external line;
   communicating means for communicating with said terminal unit;
   storing means for storing image information supplied from said terminal unit; and
   control means for controlling said interfaces, said communicating means and said storing means to thereby establish a connection between said internal and external lines and carry out a communication operation, whereby, as soon as said terminal unit has been off-hooked, said control means first examines an availability status of each of resources which include said external line interface, said communicating means and said storing means and supplies a result of such examination to said terminal unit.

2. Apparatus of claim 1, wherein said control means secures said resources for use by said terminal unit at the same time when said control means supplies the result to said terminal unit.

3. Apparatus of claim 1, wherein said control means supplies said result in the form of a dial tone which varies depending on the current availability status of said resources.

4. Apparatus of claim 1, wherein said terminal unit includes at least one of a telephone unit and a facsimile unit.

5. Apparatus of claim 4, wherein said communicating means includes a facsimile communication unit for carrying out a facsimile communication.

* * * * *